2,948,547

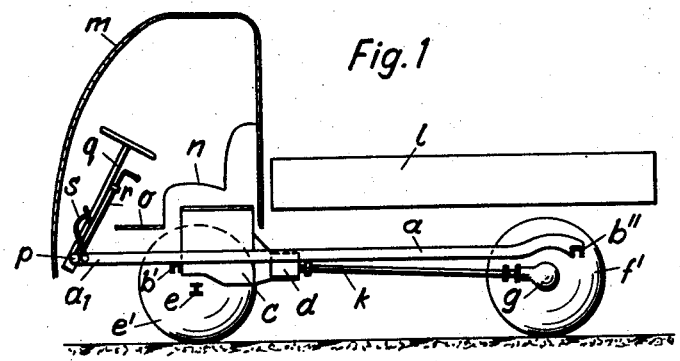
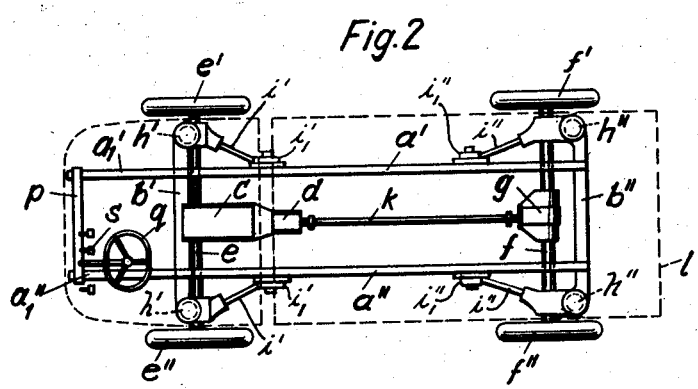
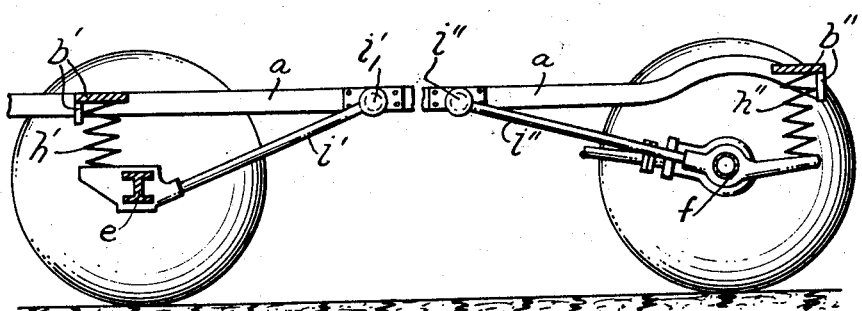

Patented Aug. 9, 1960

2,948,547
AXLE AND SPRING ARRANGEMENT FOR VEHICLES

Friedrich K. H. Nallinger, Stuttgart, Germany, assignor to Daimler-Benz Aktiengesellschaft, Stuttgart-Unterturkheim, Germany Filed May 12, 1955, Ser. No. 507,816
In Germany Oct. 1, 1948
Public Law 619, Aug. 23, 1954
Patent expires Oct. 1, 1968

1 Claim. (Cl. 280—124)

The present invention relates to a spring suspension for automobiles and similar vehicles, and particularly for small trucks, delivery cars, and the like having a short wheel base and rigid axles. Such a vehicle has the advantage of being easily turned in city traffic, of being easily loaded so that such load will be uniformly distributed over its axles, and of affording the driver ample seating space and comfort, as well as unlimited visibility especially toward the front by the fact that the driver's cab or seat may be mounted in front of the front axle and the engine or other driving unit and the fact that such engine may be mounted below, behind, or adjacent the driver's seat, but preferably between the front wheels.

It is an object of the present invention to provide an improved spring suspension, particularly for vehicles of the type as described which affords a soft resilience of the vehicle when running over a rough road with both wheels of one axle flexing through simultaneously and with equal stroke while still retaining an adequate rigidity and resistance against tilting when driving through curves and when the wheels on each axle are flexing in opposite directions, and which also avoids any tendency of the car or truck toward pitching about a transverse axis.

An essential feature of the present invention thus resides in a spring suspension for a car or truck with rigid front and rear axles, which preferably consists of coil springs which are arranged substantially vertically to the car or truck frame and are mounted outside of the wheel base thereof and preferably are supported by the ends of crossbeams which project laterally beyond the other parts of the car or truck frame.

The spring suspension according to the present invention for cars or trucks with rigid axles differs from one for individually suspended wheels by various important factors. In an independent wheel suspension, each wheel is supported at two points relative to the car frame, that is, both at the joint of the axle member and by means of the spring which is mounted on a lever extending from the axle member, which lever also determines the resilience of the spring. Thus, the spring must be relatively hard if mounted near the joint of the axle, and relatively soft if mounted near the wheel. Such different manner of mounting the springs does, however, not affect the resilience of the car, provided the other conditions affecting the resilience also remain equal, and the relation of the resilience in curves, that is, when the stroke of the outer and inner wheels is opposed to each other, toward the resilience on a straight but uneven road when the wheels move simultaneously in the same direction is also not affected by such different form of mounting. An independent spring suspension therefore has the same effect toward the vertical movements of the wheels regardless of whether they are of equal or opposed directions relative to each other, and it does not permit any relative adjustment between the two types of resilience either by varying the resilience of the springs or by shifting their position either in the direction toward the frame or toward the wheels. It is therefore basically immaterial insofar as such adjustment is concerned whether the springs are mounted near or remote from the wheels.

The situation is, however, quite different with rigid axles. Any change in the location of the springs also affects the relation between the resilience in curves and on a straight but uneven road that is, with equal strokes, on the one hand, and with opposite strokes, on the other hand, since the vertical forces acting upon the rigid axle are transmitted to the frame merely by the springs. If the springs lie closely to each other, they offer a much lower resistance in curves than when they are spaced further apart, while with springs of equal strength the resilience on a straight road remains the same regardless of their particular location. If the springs are made quite hard, the resilience may be adequate in a curve but will then be too hard on a straight road, that is, for example, twice or three times harder than desired.

If, with a rigid axle, however, contrary to the independent spring suspension wherein the ratio of the resilience remains constant, the location of the springs is shifted from the center of the vehicle toward the wheels or vice versa, this also changes the relation of the resilience in curves to that on a straight road, such relation being substantially proportional to the distance of the springs from the central plane of symmetry of the vehicle.

It has now been found, according to the present invention, that the most favorable conditions for rigid axles prevail if the springs are spaced as closely as possible to the wheels so as to have a soft spring characteristic and at the same time to obtain a sufficiently soft resilience on a straight but uneven road. Such soft spring action has, however, the disadvantage that the car or truck has a tendency toward pitching vibrations if the springs of the front and rear axles are spaced too closely together. This is true particularly for cars or trucks with a short wheel base where the springs of the front and rear axles are mounted relatively close together.

It is therefore an object of the present invention to overcome these disadvantages in cars or trucks with rigid axles by providing the springs both for the front and rear axles at a point outside of the wheelbase of the vehicle, that is, the front springs in front of the front axle and the rear springs behind the rear axle. Such arrangement according to the invention will permit the springs, despite a relatively short wheel base and despite a considerable softness of these springs, to be maintained at a sufficiently large distance from each other to prevent any pitching vibrations of the car or truck effectively.

Although motor vehicles with rigid axles have been previously known, in which coil springs have been provided in front of the front axle for resiliently suspending the front wheels, these prior designs always provided the customary leaf springs extending longitudinally of the vehicle for resiliently suspending the rear axle so that the resultant resiliency of the springs was transmitted to the car frame within the transverse plane of the vehicle which coincided with the wheel centers. There have also been other prior designs of motor vehicles with a rigid rear axle and springs mounted behind such axle. These vehicles, however, did not have any rigid front axles with springs mounted in front of such axles. The basic and novel concept of the present invention and the inventive features for carrying out such concept were therefore not contained or even considered in these prior structures.

The provision of compression springs which act upon the vehicle frame outside of the wheel base as well as outside of the longitudinal members of the frame also allows a very favorable distribution of the available space since such springs as seen in a plan view require a very small space. Although the wheel base of the car or truck may be quite short, such springs and such arrangement thereof thus create a relatively long and wide supporting surface for the vehicle frame, even though such frame itself may for reasons of a lower weight and easier manufacture be made of a small width. Since for supporting the springs only a single cross member of the frame which projects beyond the longitudinal members will be required, the torsional resistance of the frame may also be reduced.

These as well as additional objects, features, and advantages of the present invention will be further apparent from the following detailed description and the accompanying drawings of one particular preferred embodiment of the invention, wherein Fig. 1 shows a side view of a small truck according to the invention, while Fig. 2 shows a plan view thereof.

Figure 3 shows a schematic side view of the truck frame and the suspension thereof on the vehicle wheels.

Referring to the drawings, the truck frame $a$ essentially consists of two longitudinal members $a'$ and $a''$ and the cross members $b'$, $b''$, and $p$, on which the truck body consisting of the loading surface 1 and the driver's cab $m$ are mounted. As shown in the drawings, the truck body projects relatively far beyond the wheel axles $e$ and $f$ both toward the front and rear. The driving unit consisting of the engine $c$ and the gear transmission $d$ is mounted within the frame $a$ intermediate the front wheels $e'$ and $e''$, and the drive shaft $k$ leads from the transmission $d$ to the rear-axle transmission $g$. The cross member $p$ at the front end of the frame forms the support for the steering column $q$, the gear shift lever $r$ thereon, and the foot pedals $s$ for the clutch, brake, and accelerator. The driver's seat $n$ is arranged above the engine $c$, and thus likewise between the front wheels $e'$ and $e''$, so that a floor board $o$ may thus be provided which extends in front of the seat $n$ and fully across the entire width of the vehicle.

The wheel axles $e$ and $f$ are mounted on the frame by means of connecting rods $i'$ and $i''$ which are mounted on the longitudinal frame members $a'$ and $a''$ by means of joints $i_1$, and $i_1''$, respectively and extend obliquely outward both toward the front and rear, respectively. The wheel axles $e$ and $f$ are suspended by means of coil springs $h'$ and $h''$ on the cross members $b'$ and $b''$ which are laterally extended beyond the longitudinal frame members $a'$ and $a''$ and are mounted outside of the wheel base, that is, forwardly of the front axle and rearwardly of the rear axle, respectively. The lower end of the coil springs is supported in saddles formed by the extensions to beyond the axle $e$ and $f$, of the connecting rods $i'$ and $i''$ respectively. Such arrangement of the coil springs $h'$ and $h''$ results, despite the narrow truck frame and the short wheel base, in a relatively long and wide supporting surface for the frame, thus considerably improving the resilience of the vehicle as well as its ability to hug the road, as previously described, and also furnishing a frame construction of light weight which may be produced quite easily and at a low expense.

Although my invention has been illustrated and described with reference to the preferred embodiments thereof I wish to have it understood that it is in no way limited to the details of such embodiments or to the specific examples described, but is capable of numerous modifications within the scope of the appended claim.

Having thus fully disclosed my invention, what I claim is:

A motor vehicle comprising, in combination a pair of front wheels, a pair of rear wheels, a rigid front axle carrying said front wheels, a rigid rear axle carrying said rear wheels, a vehicle frame including two longitudinal members extending in a longitudinal direction in a single straight line at both sides of the vertical central longitudinal plane of said vehicle relatively close to said plane, and a front cross member attached to said longitudinal members adjacent to and in front of said front axle and extending transverse to said vehicle beyond said longitudinal members to a point adjacent to said front wheels, and a cross member attached to said longitudinal members adjacent to and behind said rear axle and extending transverse to said vehicle beyond said longitudinal members to a point adjacent to said rear wheels, said two axles being independently mounted with respect to said vehicle frame so as to be capable of an independent movement with respect to the latter, a pair of coil springs extending in a substantially vertical direction resiliently suspending said front axle and supported by the respective ends of said front cross member so as to lie completely outside said longitudinal members and in front of said front axle, and a pair of coil springs extending in a substantially vertical direction resiliently suspending said rear axle and supported at the respective ends of said rear cross member so as to lie completely outside said longitudinal members adjacent to said rear wheels and behind said rear axle, and a connecting member adjacent each of said wheels connected at one end thereof directly to said longitudinal frame member, and connecting the outer ends of said axles to said vehicle frame, said connecting members at the front of the vehicle extending from said longitudinal frame members obliquely outwardly toward said front axle, connecting members at the rear of the vehicle extending from said longitudinal frame members obliquely outwardly toward said rear axle, the extension of said connecting members to beyond said front axle and said rear axle respectively forming a support for the lower end of said coil springs.

References Cited in the file of this patent

UNITED STATES PATENTS

| | | |
|---|---|---|
| 1,933,162 | Colman | Oct. 31, 1933 |
| 2,222,397 | Broluska | Nov. 19, 1940 |
| 2,234,025 | Dellert | Mar. 4, 1941 |
| 2,367,817 | Brown | Jan. 23, 1945 |